Sept. 29, 1942.   B. F. W. HEYER ET AL   2,296,924
BATTERY CHARGER
Filed April 1, 1941
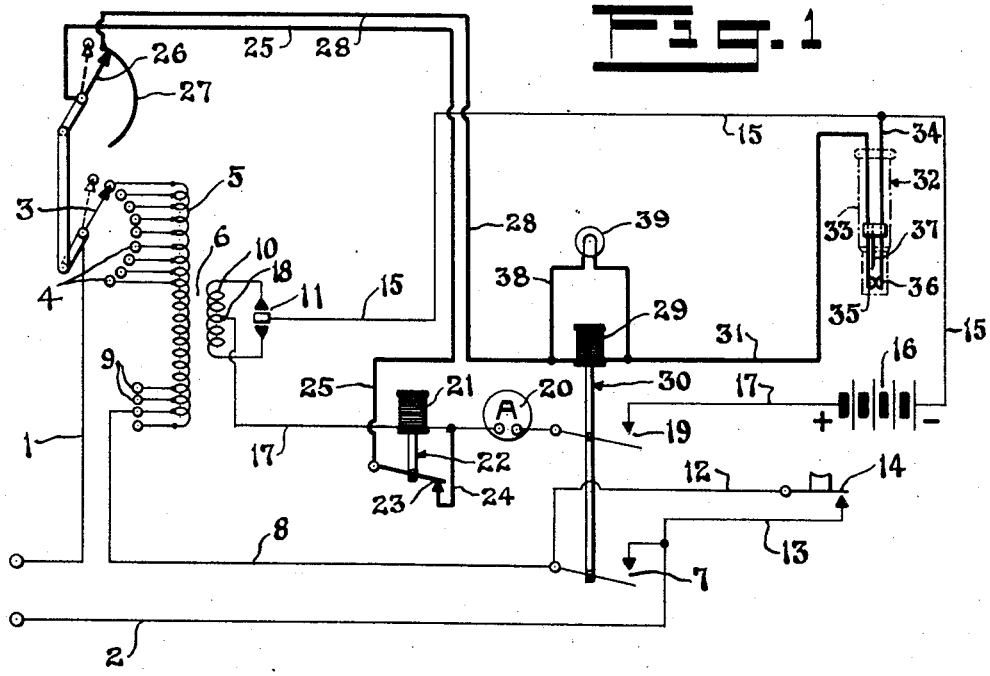
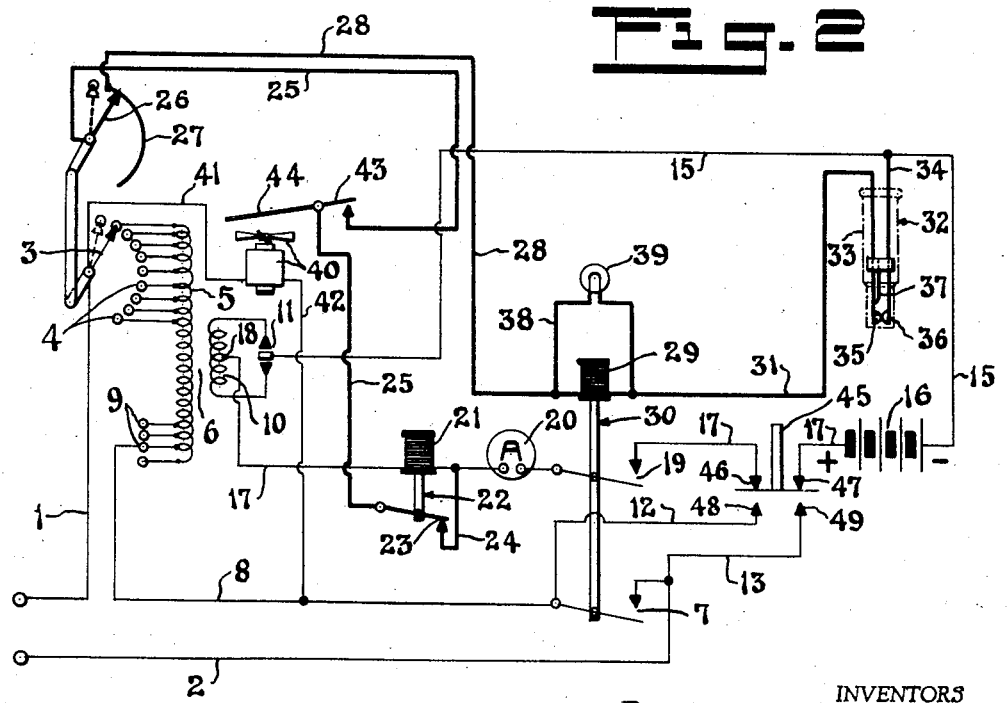
INVENTORS
Benjamin F. W. Heyer
Clarence W. Dalzell
BY
their ATTORNEY Patented Sept. 29, 1942

2,296,924

UNITED STATES PATENT OFFICE 2,296,924

BATTERY CHARGER

Benjamin F. W. Heyer, Tenafly, and Clarence W. Dalzell, Bloomfield, N. J., assignors, by direct and mesne assignments, to Knickerbocker Development Corporation Application April 1, 1941, Serial No. 386,240

3 Claims. (Cl. 171—314)

This invention relates to a new and useful improvement in devices for charging storage batteries and in charging methods. Its primary object is to greatly reduce the time required for charging and to greatly simplify the procedure. Since the device was designed primarily for charging automobile storage batteries of the usual three-cell, six-volt type, it will be described in relation to such use, but it will be understood that it may be adapted for charging storage batteries of any voltage and capacity. Any modifications required will be of a nature readily comprehended and carried out by those skilled in the art.

For many years it was the custom to utilize in the charging of storage batteries a direct current of relatively few amperes, say, six to twelve, which necessitated a charging time of many hours. Recently it has been learned that a charging current of as much as 75 to 100 amperes, or even more, can be used, provided certain precautions are taken, with a consequent reduction in the charging time of a completely discharged battery to, say, 30 to 45 minutes.

Several chargers have been devised for such fast charging by current of high amperage, but all have certain defects which are eliminated by the present invention. With chargers of this character, substantially the following procedure has been required: First, the electrolyte in the battery cell is restored to the proper level, if necessary, by the addition of distilled water. Then the specific gravity of the electrolyte is taken by means of an hydrometer. As is well known, the specific gravity of the electrolyte varies with the degree of charge in the battery so that its approximate condition with respect to charge can be determined by such a reading. Then the size of capacity of the battery, i. e., the number of plates and the size of the plates, is noted. Thereupon reference is made to a chart from which the charging time may be found at the predetermined rate, say 100 amperes, for a battery of the ascertained size and hydrometer reading.

A time-switch, which controls the operation of the charger, is now set for the time indicated by the chart and the charger started. At the expiration of the time, the charger is automatically cut off and the battery is then tested again to determine whether it has taken the charge, and to what degree. This involves the taking of the temperature of the electrolyte by means of a thermometer, and a conversion of the test indications to their equivalents at normal temperature.

It will be evident that this procedure is not only complicated, but difficult in several of its steps, and offers numerous opportunities for error. In the first place if the level of the electrolyte in the battery has to be raised by the addition of distilled water, it is quite impossible to obtain a useful hydrometer reading for some little time because the water does not mix immediately and thoroughly with the electrolyte. Therefore, the reading from which the charging time is determined may very well be incorrect.

Secondly, the operator may very easily misread the chart, which usually involves the tracing to their intersection of a vertical column of figures relating to specific gravity and a horizontal line relating to battery size, or vice versa. Obviously, if the battery can be charged in, say 30 minutes, an error which results in an overcharge of even a few minutes may well injure or even destroy the battery. In fact, danger of over-charging from this sort of error is recognized to be so great that the charts customarily indicate shorter charging times than are usually required as a precaution.

Thirdly, the operator may err in setting the time-switch so that a similar error in charging time results. Fourthly, if the current from which the charger is operated, is cut off, the time-switch nevertheless continues to run, so that charging cannot possibly be completed without repeating the entire operation from the beginning. Fifthly, the final test involving, as it does, the temperature of the electrolyte, is an operation of considerable complication since it requires the use of a testing device capable of adjustable compensation for temperature, or reference to a conversion chart prepared for the specific testing device used.

In addition, there are several very important factors which should have careful consideration, but which are generally ignored because of the additional complications created: For example, the initial condition of charge of the battery, its initial temperature and its internal mechanical condition, particularly with respect to short circuits and sulphated plates.

The initial temperature of the battery affects the length of the permissible charging time before the temperature of the eelctrolyte has risen to the safe maximum. Therefore, a setting of the time-clock, which is apparently correct, may result either in an undercharge, or destruction of the battery from over-heating.

The initial condition of charge also has a material effect upon the rate of temperature increase of the electrolyte during charge so that, here again, an apparently correct setting of the time-clock will not insure that the electrolyte will not over-heat. Compensation for these two factors could be provided for by means of additional charts, but, obviously, this would still further complicate the already too complicated charging method.

The internal mechanical condition of the battery cannot be determined in advance. For example, a cell may short-circuit during charging and, if so, the charging current will increase sharply and the temperature of the electrolyte will rise very rapidly. The only safeguard against this is constant watchfulness on the part of the operator.

A sulphated battery will also heat up much faster than normally, as a general rule, and as charging progresses its internal resistance will decrease greatly, causing a corresponding increase in the charging current, which may be so great as to damage the charger unless some protective means is provided, which has not been the case.

For these, and other reasons, fast battery charging utilizing charging currents of 100 amperes has not met with the favorable reception to which its evident advantages entitle it.

By this invention the dangers and disadvantages of fast charging devices and methods have been eliminated. It has been discovered that during charge the temperature of the electrolyte varies substantially with the degree of charge irrespective of the size of the battery or the charging time, and that the temperature of the electrolyte of a battery being charged by a current of approximately 100 amperes can be permitted to rise to a maximum of not more than 140 degrees F. without risk of damage.

This invention utilizes this temperature factor as a means of controlling the charger so that a battery, regardless of how much it is discharged, or how big it is, can be charged without any preliminary considerations whatsoever, except, of course, restoring of the electrolyte to its proper level by the addition of distilled water if necessary. No preliminary hydrometer reading is required, although one can be made if desired, no determination of charging time, no taking of the temperature of the electrolyte when the charging is completed, and no complicated final test beyond the customary one to determine that the battery is in good mechanical condition and has, in fact, taken the charge. Furthermore, in case the current from which the charger is operated is cut off, charging is simply suspended for the time being, and continues to completion when the current comes on again.

The charger is controlled by a thermostatic device inserted into the electrolyte, which breaks the charging circuit and stops the charger whenever the temperature of the electrolyte has risen to a predetermined degree, say, 130 degrees F., a point well below the limit of safety. In addition, the battery as well as the charging equipment are fully safeguarded against any accidental material increase in the charging rate beyond the specified rate as might occur, for example, from a short circuit or by connecting the battery in the wrong polarity. In such case, the charging circuit and the A. C. supply circuit are immediately opened, so that no harm can result.

Thus, by this invention substantially the entire charging operation is controlled, not by an individual, subject to human fallibilities, but by a carefully adjusted thermal-electric device which cannot err, which automatically insures that different batteries, regardless of size and condition of charge, will be re-charged to the desired degree, and will be fully protected against overcharge or charging at too high a rate.

One form of the invention as designed for standard six-volt, three-cell automobile batteries of various capacities, is described herein and shown in the accompanying drawing, of which Figure 1 is a diagram of the charger and its circuits; and Figure 2 is a similar diagram illustrating certain modifications which are desirable, but not essential.

Since most battery chargers are operated from the ordinary lighting circuit, the charger shown in the drawing and described herein is depicted as connected to a source of alternating current represented by the wires 1, 2. To one side of this circuit, that represented by wire 1, for example, is connected an adjustable contact 3 adapted to engage successively a plurality of contact points 4 connected to taps at various points of the primary 5 of transformer 6. The other side 2 of the source of current supply runs through a magnetic switch 7 and wire 8 to the other end of transformer primary 5. This end of the primary is also provided with several taps 9, to any one of which wire 8 can be connected.

The secondary 10 of the transformer is connected to a rectifier 11 by means of which the alternating current is converted into direct current. A dry disk, copper oxide rectifier is recommended, but any suitable rectifier or device capable of delivering a direct current of the required size, which will be assumed to be 100 amperes, may be used.

Taps 9 are provided in the primary of transformer 6 because the output characteristics of rectifiers tend to change somewhat after continued use. These changes can be compensated for by suitably altering the input to the rectifier by connecting wire 8 to the proper tap 9 of the transformer primary. This adjustment is a more or less permanent matter and is not involved in the battery-testing operation.

Magnetic switch 7 is shunted by a circuit represented by wires 12 and 13 closed by push-button switch 14, which is normally open. The above constitutes the A. C. circuits of the charger.

The charging circuit proper, through which the direct current of, say, 100 amperes is supplied to the battery, consists of a lead 15 running from rectifier 11 to the negative side of the battery 16 to be charged and of a lead 17 running from the positive side of the battery to mid-point tap 18 of the transformer secondary 10. In this lead 17 is also inserted a switch 19, an ammeter 20, and the winding 21 of a magnetic relay 22 so designed that the relay will not be operated by the assumed charging current of 100 amperes, but will be operated by any current of a materially greater volume, say, 120 amperes.

Magnetic relay 22 includes a switch 23 in a control circuit. Switch 23 is normally closed, as shown, and is opened only when the winding 21 of magnetic relay 22 is energized by a current of materially greater volume than the specified direct current of 100 amperes. Switch 23 is included in a circuit running from the lead 17 by means of leads 24 and 25 to an adjustable contact 26 adapted to engage a contact strip 27 and preferably mechanically connected to switch 3 so that the two switches may be moved from their off-position by the turning of a single knob to close their respective circuits at substantially the same time.

From contact strip 27 a lead 28 connects with the winding 29 of a magnetic relay 30 in which both switches 19 and 7 are included so that they are simultaneously operated.

The control circuit is completed by the leads 31 and 34 which terminate at lead 15 and between which is inserted a thermostatic control switch. This may be of any desired type provided it can be inserted through a filler hole of the battery into the electrolyte, as far as permitted by the plates, and also provided its contacts are normally closed and will separate when the electrolyte has reached a predetermined temperature of, say, 130 degrees F. The switch elements must, of course, be protected from the corrosive action of the electrolyte. Therefore, they should be enclosed in a suitable tube or capsule made of a material impervious to acid, such as rubber or lead.

A thermostatic switch and enclosing capsule is diagrammatically shown at 32 in the drawing as consisting essentially of a case 33, into which the incoming lead 31 and outgoing lead 34 are inserted, which leads are connected to the respective contact elements 35 and 36 of the thermostatic switch. These contacts, together with the thermostatic elements 37, are positioned at the end of the capsule and preferably hermetically sealed therein.

The thermostatic element may be of the usual bi-metal construction so designed and positioned that when it bends under the influence of heat it will separate the contacts 35 and 36 when the temperature of the electrolyte into which this end of the case is inserted has reached the prescribed temperature of 130 degrees F. Any other suitable form of thermostatic switch may be employed, the only requirement being that the circuit in which it is positioned be automatically and positively broken at the proper time as determined by the temperature of the electrolyte.

The winding 29 of magnetic relay 30 may be shunted by a circuit 38 in which there is a pilot light 39 which will burn whenever current is flowing through winding 29, or, in other words, whenever the charger is in operation.

This charger is operated as follows: The battery need not be removed from the car or disconnected. The charger can be taken to the battery. The operator first ascertains that the electrolyte is at the proper level and, if not, restores the level by the addition of distilled water. Then he connects the leads 15 and 17 of the charger to the battery 16 in the correct polarity, as indicated in Figure 1, and inserts thermostatic switch 32 through a filler hole into the electrolyte. He then closes switches 3 and 26, which, as heretofore stated, are preferably arranged to work together so that switch 3 makes contact with one of the end contacts 4 of the taps of the primary 5 of transformer 6, and switch 26 makes contact with contact strip 27. Although the A. C. circuits and control circuit are now closed at these points, no current will flow because the A. C. circuit is still open at the magnetic switch 7 and push-button switch 14. The charging circuit is also open at magnetic switch 19.

The operator then pushes push-button 14, which closes the shunt around magnetic switch 7 and completes the A. C. circuits so that A. C. current will flow through the primary 5 of transformer 6 from the source 1 and 2.

An alternating current is consequently induced in the secondary 10 of transformer 6, which current is converted into direct current by rectifier 11. However, the main charging circuit consisting of leads 15 and 17 is still open, at magnetic switch 19. Nevertheless, the current from the rectifier 11 will flow through lead 15 and the circuit in which thermostatic switch 32, magnetic relay winding 29, contact strip 27, and magnetic switch 23 are included. In consequence, winding 29 of magnetic relay 30 will be energized, and, since switches 7 and 19 both form a part of this relay, both of these switches will be instantaneously and simultaneously closed. Then the A. C. circuit is completed through switch 7 so that push-button 14 can be released and the main charging circuit is completed through switch 19.

The charger is now in operation and the operator moves switch 3 over contacts 4 until the charging current, as indicated by ammeter 20, has reached the required volume of, say, 100 amperes, switch 26 maintaining contact with contact strip 27. Since the A. C. current will be momentarily opened as contact 3 is moved from one of contacts 4 to another, relay 30 is preferably of the "stick" relay type, a characteristic of which is that once it has operated to close its switch or switches, switches 7 and 19 in this instance, a very small current of the order of 1 ampere, for example,, flowing through its winding, will keep it energized sufficiently to prevent the opening of the switches. The battery 16 will almost always be able to supply such a current regardless of its state of discharge or condition. Without this type of relay it will be necessary to operate push-button 14 between each adjustment of contact 3 to start the charger again by closing switches 7 and 19. The charger continues to operate until the temperature of the electrolyte has reached the assumed temperature of 130 degrees F., when thermostatic switch 32 will open to break the control circuit.

Since the winding 29 of relay 30 is in the same circuit, the relay is deenergized, and switches 7 and 19 open to break both the A. C. and the main charging circuits. As long as thermostatic switch 32 remains open, and it will remain open until the temperature of the electrolyte has fallen several degrees, which will take a very considerable period of time, it is impossible to close the main charging circuit again. The only error the operator can make is to close the A. C. circuit again by means of push-button switch 14, but this will not cause the closing of the main charging circuit because the magnetic relay 29, of which switch 19 is a part, is under the direct control of thermostatic switch 32. Therefore, this charger is fool-proof in this respect.

In case the operator connects the battery 16 in the wrong polarity, or a short circuit occurs, the charger may deliver a current considerably higher than that prescribed, assumed to be 100 amperes. To protect the battery and charging equipment from damage from excessive charging current resulting from this or any other contingency, overload relay 22 is included in the main charging circuit. As heretofore explained, this relay is so designed that it will not be caused to operate unless the current passing through its winding 21 is considerably greater than the prescribed charging current, say, at least 120 amperes. If such a current flows through the charging circuit, magnetic relay 22 immediately functions to open its switch 23, which breaks the control circuit, and, consequently, deenergizes magnetic relay 30, with the result that switches 7 and 19 are both opened, and the A. C. and main charging circuits both broken. Therefore, it is absolutely impossible for the operator to keep the charger in operation under these conditions even if he keeps his finger on push-button switch 14.

If the A. C. current in leads 1 and 2 should happen to be cut off before charging is completed, enough current will flow from the battery 16 through winding 29 of magnetic relay 30 to keep the switches 7 and 19 closed, as explained above, but not enough to materially discharge the battery. Therefore, all the circuits remain closed so that when the A. C. current comes on again, the charging of the battery will continue from where it left off, without attention on the part of the operator.

After the charging is completed the battery is tested to determine whether it has taken the charge, but since the temperature of the electrolyte is known (130° F.) a tester calibrated for this temperature is all that is required. No adjustments, conversions or reference to a chart are necessary.

Since any rectifier, particularly one designed to deliver a current as great as 100 amperes becomes hot, it may be thought desirable to cool it. A simple modification for this purpose is shown in Fig. 2. This consists of a fan 40 connected by lead 41 and 42 across the A. C. input circuit and an air switch 43 inserted in one of the leads, 25 for example, of the control circuit. A vane 44 lying directly in the air stream from fan 40 is attached to switch 43, so that whenever the fan is running, switch 43 will be closed. Preferably, rectifier 11 and fan 40 are surrounded by an open-ended housing (not shown) through which a strong stream of air will be drawn by the fan. Failure of the fan to operate will not result in damage to the rectifier because switch 43 is in the control circuit, which, as heretofore explained, also includes the winding 29 of magnetic relay 30, so that neither the A. C. nor the main charging circuit switches, 7 and 19, can be closed while switch 43 is open.

Another modification of the circuit of Figure 1 is also illustrated in Figure 2 in relation to the bush-button switch. As already explained, if for any reason the charging current becomes too large, magnetic relay 22 will operate to open its switch 23 to break the control circuit as a result of which the A. C. and main charging circuits will also be broken through the de-energizing of winding 29 of magnetic relay 30, and the consequent opening of switches 7 and 19. The operator, not realizing the reason why the charger has stopped, may push the button again, which will again cause switches 7 and 19 to close, but switch 23 will instantly open again to break the circuits. If the operator stubbornly keeps his finger on push-button 14, a "pumping" action will result, switches 7 and 19 closing, followed by the opening of switch 23 and the opening of switches 7 and 19, followed by the closing of switch 23, the closing again of switches 7 and 19, the opening of switch 23, the opening of switches 7 and 19, and so on.

To prevent this, the push-button 45 is provided with two pairs of contacts, one pair 46 and 47, in lead 17 of the main charging circuit, and the other pair 48 and 49 in leads 12 and 13 of the A. C. circuit. Normally, the position of the push-button is such that the main charging circuit is closed, as shown in Figure 2. When the push-button 45 is pressed by the operator, the A. C. circuit is completed through contacts 48 and 49, but the main charging circuit is opened at contacts 46 and 47, so that even though switches 7 and 19 close, the main charging circuit remains open. Therefore, winding 21 of magnetic relay 22 will not be energized and switch 23 of this relay will remain closed. Consequently, the "pumping" action is rendered impossible and also the battery 16 is isolated from the too heavy current. Whenever the operator releases the button, the main charging circuit is restored at contacts 46 and 47, but relay 22 will instantly act to open switch 23, which will result in the breaking of both A. C. and charging circuits at switches 7 and 19, so no matter what the operator does, there is no possibility of subjecting the battery to the too heavy charging current, and damage of the charger is prevented. Either one of both of these modifications may be utilized without materially altering the circuit of Fig. 1, or its characteristic mode of operation.

Although the charger of this invention is shown as connected to an A. C. source, it will be understood that the source may be D. C. if preferred, in which case the A. C. circuits and rectifier will be dispensed with. However, this will not alter the main charging circuit, or the control circuit bridged across it.

If desired, the control circuit can be eliminated and the thermostatic switch included directly in either the main D. C. charging circuit or the A. C. circuit, or both. In any of these arrangements the charger is still under the control of the thermostatic switch and will cease to operate when the electrolyte has reached the predetermined temperature. To break either the D. C. or A. C. circuits in this way, the thermostatic switch may be of the single contact type diagrammatically illustrated in the drawing, inserted directly into the circuit in question. To break both D. C. and A. C. circuits will, obviously, require a switch having two sets of contacts preferably operated in unison by the same thermostatic element. Although certain desirable features are sacrificed by eliminating the control circuit, these modifications produce a simple and inexpensive charger, and provide means for converting other types of fast chargers into the temperature-controlled type of this invention.

It will have been made evident that the most important and most dangerous factor in battery charging is temperature, which is affected by so many variables that it is virtually impossible for the operator of a fast charger to ascertain or guard against its fluctuations. With this invention it is absolutely impossible for the temperature of the battery to rise higher than the predetermined value, assumed to be 130 degrees F., regardless of its initial temperature, its initial state of charge, defective mechanical condition, or final state of charge, no matter what the operator may do or neglect to do. Furthermore, the battery and the charger itself is equally well protected against damage by excessively high charging currents. Nevertheless, it is so simple to use that the operator has little to do except make the required connections and turn on the current.

We claim:

1. A storage battery charger which comprises a

D. C. circuit into which the battery to be charged can be connected, a control circuit bridged across said D. C. circuit, a switch in said D. C. circuit between said battery and a point of connection of said control circuit with the D. C. circuit, said switch being normally open, an electro-magnet in said control circuit connected to said D. C. switch for closing said D. C. switch when current flows through said control circuit, a switch in said control circuit, said switch being normally closed, an electro-magnet in said D. C. circuit connected to said switch in said control circuit and adapted to open said switch when the current in said D. C. circuit exceeds a pre-determined value, and a thermo-mechanical switch in said control circuit which is normally closed, said thermo-mechanical switch being adapted to be located in heat-responsive relation to the electrolyte of a battery being charged by said D. C. circuit and adapted to open to break said control circuit when the temperature of the electrolyte exceeds a pre-determined degree thereby de-energizing the electro-magnet in said control circuit and permitting the switch in said D. C. circuit to open.

2. A storage battery charger which comprises a circuit connectible to a source of alternating current, means for converting said alternating current into direct current, a direct current circuit for conducting said direct current to the battery to be charged, a control circuit bridged across said D. C. circuit, a switch in said D. C. circuit between said battery and a point of connection of said control circuit with the D. C. circuit, a switch in said A. C. circuit, both of said A. C. and D. C. switches being normally open, a shunt around said A. C. switch, a switch in said shunt for completing said A. C. circuit independently of said A. C. switch, an electro-magnet in said control circuit connected to said A. C. and D. C. switches for closing said switches when current flows in said control circuit, a switch in said control circuit, said switch being normally closed, an electro-magnet in said D. C. circuit connected to said switch in said control circuit and adapted to open said switch when the current in said D. C. circuit exceeds a pre-determined value, and a thermo-mechanical switch in said control circuit which is normally closed, said thermo-mechanical switch being adapted to be located in heat-responsive relation to the electrolyte of a battery being charged by said D. C. circuit and adapted to open to break said control circuit when the temperature of the electrolyte of the battery exceeds a pre-determined degree to thereby de-energize the electro-magnet in said control circuit and to permit the switches in said A. C. and D. C. circuits to open.

3. A storage battery charger which comprises a circuit connectible to a source of alternating current, means for converting said alternating current into direct current, a direct current circuit for conducting said direct current to the battery to be charged, a control circuit bridged across said D. C. circuit, a switch in said D. C. circuit between said battery and a point of connection of said control circuit with the D. C. circuit, a switch in said A. C. circuit, both of said A. C. and D. C. switches being normally open, a normally-open shunt around said A. C. switch, a second switch in said D. C. circuit which is normally closed but which when open is adapted to close said shunt, an electro-magnet in said control circuit connected to said A. C. and D. C. switches for closing said switches when current flows in said control circuit, a switch in said control circuit, said switch being normally closed, an electro-magnet in said D. C. circuit connected to said switch in said control circuit and adapted to open said switch when the current in said D. C. circuit exceeds a predetermined value, and a thermo-mechanical switch in said control circuit which is normally closed, said thermo-mechanical switch being adapted to be located in heat-responsive relation to the electrolyte of a battery being charged by said D. C. circuit and adapted to break said control circuit when the temperature of the electrolyte of the battery exceeds a pre-determined degree to thereby de-energize the electro-magnet in said control circuit and to permit the switches in said A. C. and D. C. circuits to open.

BENJAMIN F. W. HEYER.
CLARENCE W. DALZELL.